Aug. 18, 1925.

J. E. SCHENCK 1,550,101

FORTUNE TELLING GAME

Filed Jan. 27, 1925

INVENTOR

Jay E. Schenck.

BY H. S. Bailey ATTORNEY

Aug. 18, 1925.

J. E. SCHENCK 1,550,101

FORTUNE TELLING GAME

Filed Jan. 27, 1925    2 Sheets-Sheet 2

Fig.3.

QUESTIONS.
1 Where will I be twelve months from today?
2 Will I live to be very old?
3 What occupation should I pursue?
4
5
6
7
8
9 Will I take any long trips?

Fig.4.

MYSTICOMBINATIONS

      

| | | | | |
|---|---|---|---|---|
| 1 | MEK | PLO | UDY | FJV |
| 2 | GEM | IQR | KKX | OIY |
| 3 | | | | |
| 4 | | | | |
| 5 | | | | |
| 6 | | | | |
| 7 | | | | |
| 8 | | | | |
| 9 | FQO | PMJ | WQM | IPK |

Fig.5.

ANSWERS.    13

Q  You need not worry.

R  There was an old lady who lived in a shoe.

S  The month of roses.

T  Such is always true.

U  Two. You will never return from the second.

INVENTOR

Jay E. Schenck.

BY H. S. Bailey. ATTORNEY

Patented Aug. 18, 1925.

1,550,101

UNITED STATES PATENT OFFICE.

JAY E. SCHENCK, OF FITZSIMONS, COLORADO.

FORTUNE-TELLING GAME.

Application filed January 27, 1925. Serial No. 5,094.

*To all whom it may concern:*

Be it known that I, JAY E. SCHENCK, a citizen of the United States of America, residing at Fitzsimons, county of Adams, and State of Colorado, have invented a new and useful Fortune-Telling Game, of which the following is a specification.

This invention relates to fortune telling games.

The object of the invention is to provide a game of this character comprising a booklet in which is printed a number of questions, a corresponding number of answers, and a number of arbitrary symbols, under each of which is printed a list of letter combinations, corresponding in number to the number of questions; said booklet being used in connection with a mechanism comprising a rotatable pointer and a series of rotatable disks of progressively decreasing diameter, each disk having an alphabet displayed thereon in circular form, one of said disks having in addition the numbers from 1 to 26 arranged indiscriminately and in circular form, the topmost or smallest disk having symbols displayed thereon corresponding to those in the booklet, said pointer, when spun, affording a chance selection of one of the symbols, the combination of letters under that symbol in the booklet, having the same number as the number of the question asked, being the combination which determines the answer to the question asked; and by arranging the disks so as to bring the letters of this combination in radial line, the page of the booklet on which the answer is to be found is indicated, as well as the particular answer to the question, as will hereinafter be fully set forth.

Referring to the accompanying drawings:

Figure 3 is a view of a portion of one of the leaves of the booklet forming part of the game, and having a list of questions thereon.

Figure 4 is a view of a portion of one of the pages of the booklet, having the symbols and letter combinations displayed thereon, and Figure 5 is a view of a portion of one of the pages having the answers to the said questions.

Figure 1:
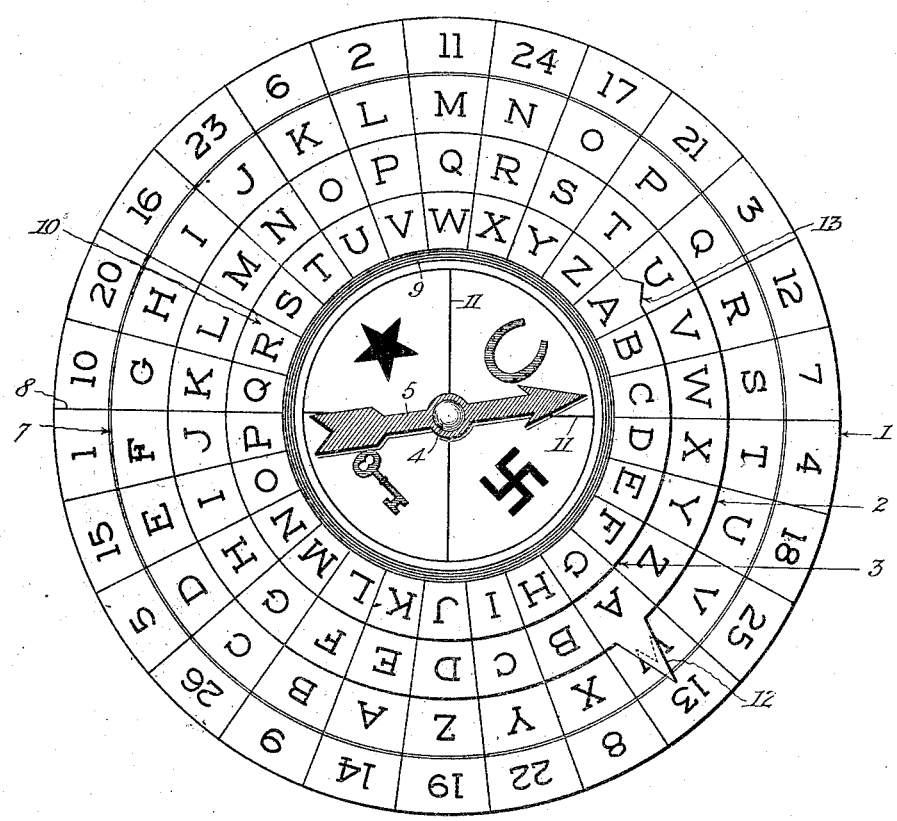
Figure 1 is a plan view of the mechanical element of the game, comprising a series of pivotally connected disks provided with letters, numbers, and symbols arranged in circular form and surmounted by a pivoted pointer.
Figure 2:
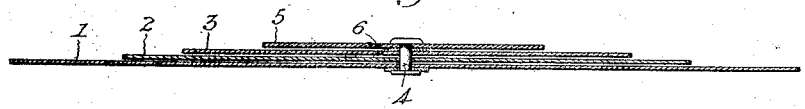
Figure 2 is a vertical sectional view of the same.

Referring to the drawings:

The numerals 1, 2 and 3 indicate disks which are made of any suitable material, and which are pivotally mounted on a pin 4. On the pin 4, and above the topmost disk 3 is also pivotally mounted a pointer 5 in the shape of an arrow, a thin washer 6, being preferably interposed between the disk and the pointer, in order that the pointer may spin freely upon its pivot without contacting with the disk, as will be understood by reference to Figure 2.

The disks decrease in diameter, in progressive order beginning with the bottom disk which is the largest. The surface of the bottom disk 1, which projects beyond the circumferential edge of the adjoining disk 2, is divided by a circular double line 7 into two parts of equal width, and these parts are each divided by radial lines 8 into twenty six spaces. The outer circle of spaces are numbered indiscriminately from 1 to 26, and on the inner circle of spaces are displayed the letters of the alphabet in regular order. The part of the next smaller or middle disk 2, which extends beyond the top disk, is also divided by radial lines into twenty six spaces on which are displayed the letters of the alphabet in regular order, and the top disk 3 is divided by circular lines 9, into an outer circular space 10, of the same width as the lettered spaces on the disks 1 and 2, and an inner space which is divided into four equal spaces by lines 11, which extend at right angles to each other through the axis of the disk. The outer space 10 of this disk is divided by radial lines, into twenty-six spaces bearing the letters of the alphabet in regular order, and in the four inner spaces are displayed four arbitrary symbols, those illustrated in the drawing being a star, a horse shoe, the representation or design known as "swastica," and a key. The pointer 5 is spun in the usual manner, and when it comes to a pause, the symbol in the space indicated by the head of the pointer, determines the nature of the answer to any one of a number of questions which are printed in a booklet which forms a co-operating element of the game, and which will now be described.

The booklet comprises a page or pages on which are printed a list of questions, for example, sixty-five questions; a page or pages designated by the word "Mysticombinations", on which are displayed the four symbols above mentioned, under each of which is printed a column of letter combinations, corresponding in number to the number of questions, a portion of one of such pages being shown in Figure 4, and pages of answers to the said questions, a portion of one of said pages being shown in Figure 5.

The questions are numbered consecutively from 1 to 65, and the rows of letter combinations are also numbered from 1 to 65, there being four combinations in each horizontal line or row, and each combination comprising three letters to correspond with the number of disks 1, 2 and 3. Each combination of letters determines an answer to a question, and therefore, there are four different answers to each question, as determined by the four symbols, and therefore, as there are sixty five questions, there must necessarily be two hundred and sixty answers, and these answers are divided into groups of ten each, each group being printed on a separate page, and the pages being numbered from 1 to 26.

The answers are indicated in consecutive order by a letter of the alphabet, thus requiring ten alphabets to indicate the two hundred and sixty answers.

The numbers on the disk 1, indicate the pages on which the desired answer is to be found, and the disk 2, is provided with a pointer 12, which overlaps the circle of letters on the disk 1, and indicates any one of the numbers on the said disk 1, and the disk 3 is also provided with a pointer 13, which indicates any one of the letters on the disk 2, such letter indicating the answer on the page indicated by the pointer 12, as will now be fully shown in the process of finding an answer to any one of the questions.

For example, Question No. 9, "Will I take any long trips?" is asked. The person asking the question then flicks the pointer 5, which after spinning, comes to a pause, indicating, for example, the horse shoe symbol. The questioner then consults the page entitled "Mysticombinations" line 9, and under the horse shoe symbol in that line, is printed the combination WQM. He then turns the disks 1, 2, 3 to bring the letters WQM in radial alignment, as shown in the drawing, and when that is done, the pointer 12, on the disk 2, points to the number 13 on the disk 1, which indicates the page on which the answer will be found; and the pointer 13 on the disk 1, points to the letter U on the disk 2, and this letter indicates the particular answer to the question. Then by turning to page 13, letter U, the answer will be found to be:

"Two. You will never return from the second."

It will thus be seen that the pointer 5 affords a chance selection of a symbol, the symbol determines the letter combinations, and the number of the question determines the particular combination of letters under any one of the symbols; and when the disks are turned to bring the letters of this combination in radial line, the answer is ascertained in the manner above described.

In preparing the answers to the questions, it will be, of course, understood that the letter combinations are arbitrary, but a suitable answer to the same question must be prepared for each symbol, and this answer must appear on the page indicated by the pointer 12, and in line with the letter indicated by the pointer 13, when the disks are moved to give a combination corresponding to the combination under the symbol having the same number as the question asked.

While I have shown three rotary disks, 1, 2 and 3, a greater number may be employed, if desired, but the number of letters in the letter combinations under the symbols, must always correspond with the number of disks, and more than four symbols may be employed, but the number of answers to each question must always correspond to the number of symbols.

Having described my invention, what I claim as new and desire to secure by Letters Patent, is:

1. In a game of the character described, a series of rotatable disks having a common pivot, each of said disks having an alphabet displayed thereon in circular form, one of said disks having in addition a series of numbers thereon in circular form, symbols displayed up on the topmost disk, means on said pivot for moking a chance selection of one of said symbols, a booklet forming a cooperating part of said game, having numbered questions and answers to said questions designated in order by the letters of the alphabet, symbols corresponding to the symbols on said topmost disk and a list of letter combinations under each symbol corresponding in number to the number of questions, said disks being adapted to be turned to register a combination of letters in radial line, corresponding to that combination of letters under a predetermined symbol having the same number as the number of the question asked, and pointers on two of said disks which indicate respectively the number of the page in the booklet on which the answer to the question is to be found and the particular answer for the particular letter combination.

2. In a game of the character described, a series of rotatable disks of progressively increasing diameter from the topmost disk, and having a common pivot pin, each of said disks having an alphabet arranged in circular form thereon, the bottom disk having in addition a circular row of numbers thereon from 1 to 26 arranged in indiscriminate order, said topmost disk having also a number of arbitrary symbols thereon; a rotatable pointer on said pivot pin above said topmost disk for determining a chance selection of one of said symbols; a booklet forming a cooperating part of said game, having numbered questions, and answers to said questions designated in order by the letters of the alphabet, symbols corresponding to the symbols on said topmost disk and a number of letter combinations under each symbol, corresponding to the number of questions; said disks being adapted to be turned to present a combination of letters in radial alignment corresponding to that combination of letters under a predetermined symbol having the same number as the number of the question asked; a pointer on the middle disk which designates a number on the bottom disk which is the number of the page in the booklet on which the answer will be found, and a pointer on the topmost disk which designates a letter on the middle disk, which indicates the particular answer on said page to the particular letter combination.

In testimony whereof I affix my signature.

JAY E. SCHENCK.